(12) United States Patent
Jaggard et al.

(10) Patent No.: US 8,181,913 B2
(45) Date of Patent: May 22, 2012

(54) SLAT SUPPORT FUNK PLATE

(75) Inventors: Philip R. Jaggard, Bristol (GB); Robert H. West, Bristol (GB)

(73) Assignee: Airbus Operations Limited, Bristol (GB)

( * ) Notice: Subject to any disclaimer, the term of this patent is extended or adjusted under 35 U.S.C. 154(b) by 742 days.

(21) Appl. No.: 12/246,816

(22) Filed: Oct. 7, 2008

(65) Prior Publication Data
US 2009/0127402 A1 May 21, 2009

(30) Foreign Application Priority Data
Nov. 15, 2007 (GB) .................................. 0722425.6

(51) Int. Cl.
*B64C 3/50* (2006.01)
(52) U.S. Cl. ........ 244/214; 244/213; 244/215; 244/35 R
(58) Field of Classification Search ............... 244/213, 244/214, 35 R, 215
See application file for complete search history.

(56) References Cited

U.S. PATENT DOCUMENTS

| | | | | |
|---|---|---|---|---|
| 1,427,012 A | * | 8/1922 | Page | 244/210 |
| 1,917,428 A | | 7/1933 | Burnelli | |
| 2,938,680 A | * | 5/1960 | Greene et al. | 244/214 |
| 2,990,140 A | * | 6/1961 | Mazelsky | 244/210 |
| 3,486,720 A | * | 12/1969 | Seglem et al. | 244/210 |
| 3,940,093 A | * | 2/1976 | Cabriere | 244/203 |
| 3,949,957 A | * | 4/1976 | Portier | 244/210 |
| 4,360,176 A | * | 11/1982 | Brown | 244/214 |
| 4,399,970 A | * | 8/1983 | Evans | 244/214 |
| 4,470,569 A | * | 9/1984 | Shaffer et al. | 244/214 |
| 4,471,928 A | * | 9/1984 | Cole | 244/215 |
| 4,475,702 A | * | 10/1984 | Cole | 244/214 |
| 4,615,499 A | * | 10/1986 | Knowler | 244/134 B |
| 4,640,477 A | * | 2/1987 | Pace | 244/214 |
| 4,650,140 A | * | 3/1987 | Cole | 244/214 |
| 4,706,913 A | * | 11/1987 | Cole | 244/214 |
| 4,753,402 A | * | 6/1988 | Cole | 244/210 |
| 4,838,503 A | * | 6/1989 | Williams | 244/214 |
| 4,880,189 A | * | 11/1989 | Day | 244/214 |
| 5,044,580 A | * | 9/1991 | Williams | 244/214 |
| 5,094,412 A | * | 3/1992 | Narramore | 244/214 |
| 5,158,252 A | * | 10/1992 | Sakurai | 244/214 |

(Continued)

FOREIGN PATENT DOCUMENTS
EP       0227643 A2    7/1987
(Continued)

OTHER PUBLICATIONS
UK Search Report for GB0722425.6 dated Mar. 7, 2008.

*Primary Examiner* — Stefanos Karmis
*Assistant Examiner* — Howard Sanders
(74) *Attorney, Agent, or Firm* — Lowe, Hauptman, Ham & Berner, LLP

(57) ABSTRACT

An aircraft wing high lift assembly comprising a movable element and a load receiving element including a body portion having a first load receiving region arranged to receive loads from the movable element in a first direction during normal operation of the high lift assembly and including at least one restraining arm projecting from the body portion, the or each restraining arm having a second load receiving region arranged to receive loads from the movable element in a second direction in the event of a failure within the high lift assembly.

9 Claims, 3 Drawing Sheets

U.S. PATENT DOCUMENTS

| | | | |
|---|---|---|---|
| 5,544,847 A * | 8/1996 | Bliesner | 244/214 |
| 5,628,477 A * | 5/1997 | Caferro et al. | 244/214 |
| 5,681,013 A * | 10/1997 | Rudolph | 244/214 |
| 5,839,699 A * | 11/1998 | Bliesner | 244/214 |
| 5,927,656 A * | 7/1999 | Hinkleman | 244/203 |
| 6,149,105 A * | 11/2000 | Jaggard | 244/214 |
| 6,457,680 B1 * | 10/2002 | Dobrzynski et al. | 244/210 |
| 2010/0163685 A1 * | 7/2010 | Vormezeele et al. | 244/214 |
| 2010/0187368 A1 * | 7/2010 | Cathelain et al. | 244/214 |
| 2011/0011984 A1 * | 1/2011 | Voss et al. | 244/214 |
| 2011/0024575 A1 * | 2/2011 | Wheaton et al. | 244/214 |
| 2011/0168849 A1 * | 7/2011 | Parker | 244/214 |

FOREIGN PATENT DOCUMENTS

| | | |
|---|---|---|
| GB | 1461792 | 1/1977 |

* cited by examiner

US 8,181,913 B2

SLAT SUPPORT FUNK PLATE

RELATED APPLICATIONS

The present application is based on, and claims priority from, British Application Number 0722425.6, filed Nov. 15, 2007, the disclosure of which is hereby incorporated by reference herein in its entirety.

FIELD OF THE INVENTION

The present invention relates to aircraft structures. More particularly, although not exclusively, the invention relates to aircraft wing movables structures including methods and apparatus for arranging high-lift devices on the wing structure.

BACKGROUND OF THE INVENTION

The structure of a modern aircraft wing generally includes a main structural component referred to as the wing box that carries the main structural and aerodynamic loadings applied to the wing, as well as functioning to join the wing to the aircraft fuselage. The wing box generally includes at least a front and rear longitudinal spar with a number of lateral ribs connected between the front and rear spars. In addition to the wing box the aircraft wing generally includes deployable aerodynamic devices including the flaps, located along the trailing edge of the wing, and the slats, located along the leading edge of the wing. The function of both the slats and flaps is to alter the aerodynamic properties of the wing, principally to provide additional lift at low speeds, for example during landing and take off of the aircraft. The support and actuating mechanisms for the leading edge slats are typically mounted on a plurality of transverse ribs that extend from the front face of the front spar of the wing box. In a typical arrangement the slat support includes a longitudinal track that can be extended and retracted to deploy and stow the aerodynamic surfaces of the slat. The slat track is supported by a number of support elements connected to adjacent ribs. Two of the requirements that must be met by the track supporting elements are that there must be a mechanism for restraining the slat should one or more of the primary support elements fail and that the track supports function to transfer the lateral loads experienced by the slat track from the slats back to the main wing structure (wing box).

The amount of space required by the slat support elements dictates how far forward the front spar of the wing box can be located within the overall wing structure. It is desirable for the front spar of the wing box to be located as far forward as possible within the wing, since this brings various benefits. For example, the wing box has a greater width which increases the overall strength and efficiency of the wing box, increases the capacity of the internal fuel tank and reduces the moments applied to the wing box from any engine pylons. However, to move the front spar of the wing box forward the space required by the slat support elements must be reduced.

SUMMARY OF THE INVENTION

According to a first aspect of the present invention there is provided an aircraft wing high lift assembly comprising a movable element and a load receiving element including a body portion having a first load receiving region arranged to receive loads from the movable element in a first direction during normal operation of the high lift assembly and including at least one restraining arm projecting from the body portion, the or each restraining arm having a second load receiving region arranged to receive loads from the movable element in a second direction in the event of a failure within the high lift assembly.

The first and second load receiving regions may comprise reduced friction wear pads.

The load receiving element preferably includes two restraining arms arranged such that the second load receiving region of each restraining arm face one another.

A face of the movable element adjacent to the first load receiving region of the load receiving element may include a protruding stop element arranged to abut against the load receiving element and prevent further translation of the movable element in the event of a failure within the high lift assembly.

The assembly may comprise two load receiving elements located adjacent opposite faces of the movable element.

According to a second aspect of the present invention there is provided an apparatus for receiving loads from an aircraft wing high lift assembly, the apparatus comprising a body portion having a first load receiving region arranged to receive loads from the high lift assembly in a first direction during normal operation of the high lift assembly and at least one restraining arm projecting from the body portion having a second load receiving region arranged to receive loads from the high lift assembly in a second direction in the event of a failure within the high lift assembly.

The first and second load receiving regions may comprise low friction wear pads.

The apparatus may comprise two restraining arms projecting from the body portion such that the second load receiving region of each restraining arm faces one another.

The first and second load receiving regions are preferably substantially orthogonal to one another.

BRIEF DESCRIPTION OF THE DRAWINGS

An embodiment of the present invention is described below, by way of an illustrative example only, with reference to the accompanying figures, in which.

Figure 1:
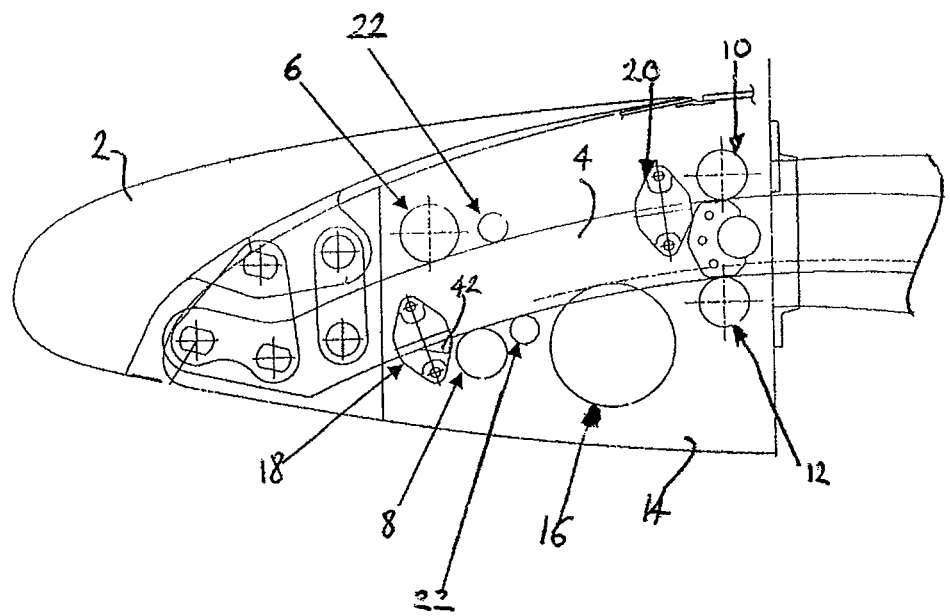
FIG. 1 schematically illustrates a slat track support and failure mechanism according to the prior art.

As noted above, the design of any of the leading edge high lift devices, such as slats, must fulfill certain engineering and safety criteria including that the slats and associated structures remain attached to the remainder of the wing assembly in the event of a failure within the slat mechanism and also that adequate provision is made to transfer the lateral loads experienced by the slat mechanisms from the slats themselves to the main wing structures. A prior art arrangement of a slat assembly that achieves both these requirements is schematically illustrated in FIG. 1. The aerodynamic element 2 of the slat that must be movable between the deployed and stowed positions is connected to one or more slat tracks 4. Each slat track is an elongate beam that is arranged to be driven between the slat stowed and deployed positions. In the particular example illustrated in FIG. 1, the slat track 4 is a curved beam that is supported by first and second pairs of upper and lower rollers, each roller 6, 8, 10, 12 being mounted between adjacent track ribs 14, each slat rib 14 being in turn connected to the front face of the forward spar of the wing box (not shown). The slat track 4 is moved between the stowed and deployed positions by means of a drive gear 16 that engages with a tooth rack located on the lower face of the slat track 4 in the manner of a rack and pinion. To transfer the lateral loads applied to the slat track front side rollers and rear side rollers 18, 20 bear against the side faces of the slat track. In the event of the failure of one or both of the first, forward, pair of guide rollers 6, 8, a pair of auxiliary rollers, or more commonly pins, 22 are provided that in the event of failure of the forward guide rollers take over the function of the rollers. The auxiliary rollers/pins 22 are referred to as funk pins.

It can be observed from FIG. 1 that the requirement to include the funk pins 22 and the forward side roller 18 requires a minimum amount of space that effectively limits how far forward the front spar can be brought with respect to the forward face of the track ribs 14. As previously discussed, bringing the front spar of the wing box forward as far as possible reduces the overall weight of the wing box.

Figure 2:
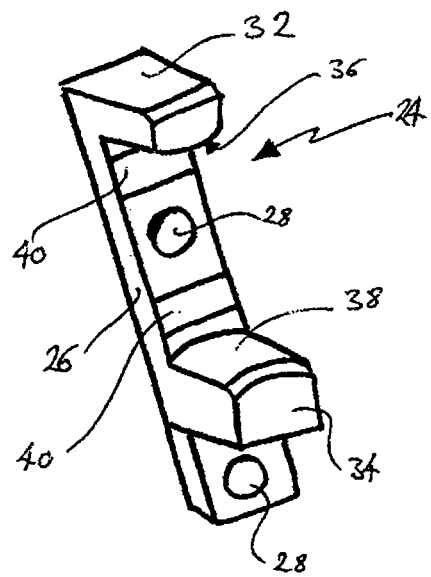
FIG. 2 is a perspective view of funk plate according to an embodiment of the present invention.
Figure 3:
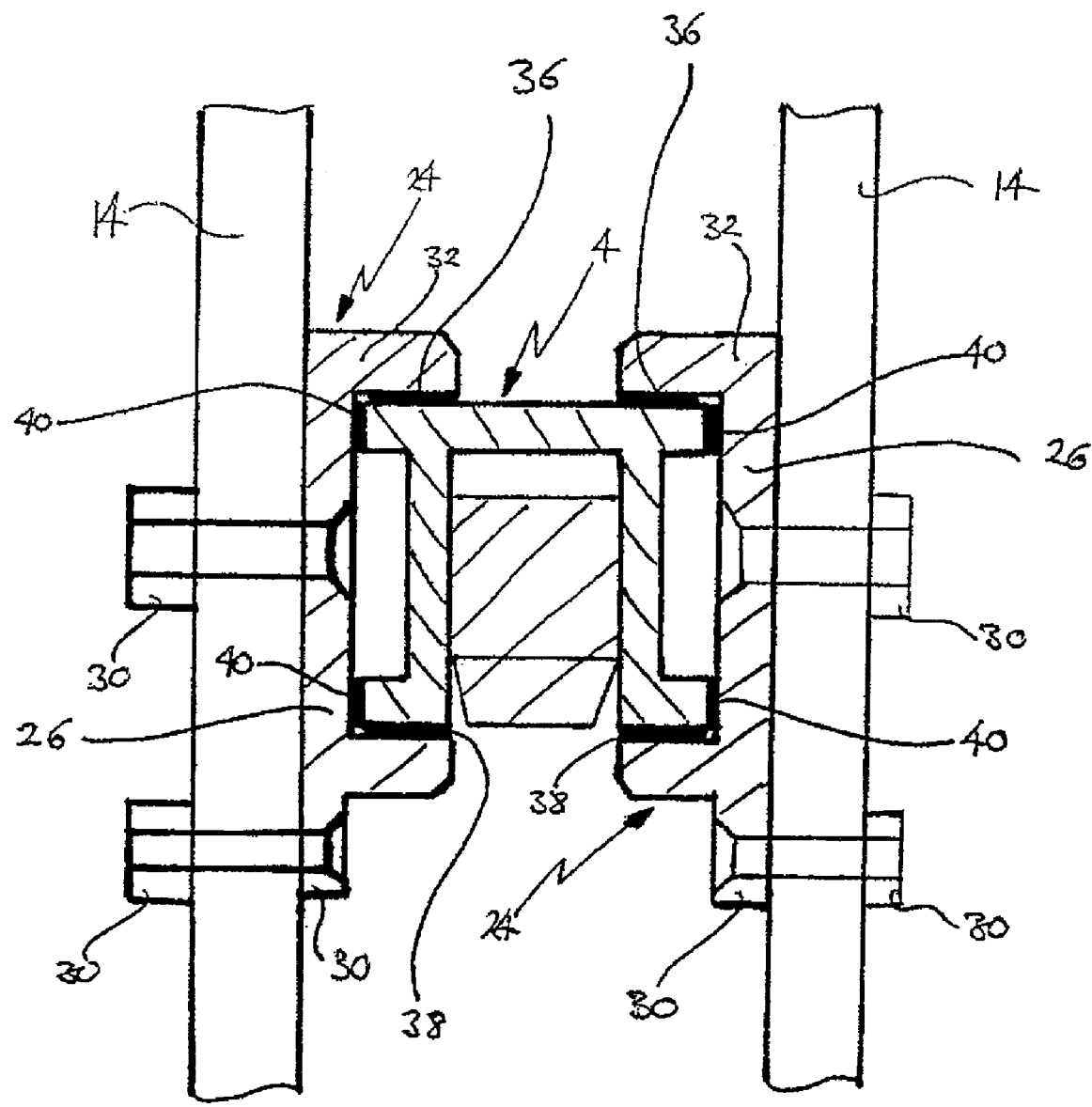
FIG. 3 schematically illustrates a cross section of a pair of funk plates according to embodiments of the present invention in situ with a slat track and track ribs.

In embodiments of the present invention the functions of the front side roller and the funk pins are combined within a single element, referred to hereinafter as the funk plate. A perspective view of a funk plate according to an embodiment of the present invention is shown in FIG. 2, whilst a cross section through a pair of funk plates, adjacent track ribs and slat track is schematically illustrated in FIG. 3. Referring to FIGS. 2 and 3, each funk plate 24 has a generally elongate, preferably rectangular, main body 26 having a number of through holes 28 through which conventional fasteners may be passed to allow each funk plate to be secured to an adjacent track rib 14. In FIG. 3 each funk plate is illustrated as being secured to an adjacent track rib 14 by means of counter sunk nuts and bolts 30. Projecting from the main body 26 of the funk plate are upper and lower restraining arms 32, 34, which in preferred embodiments extend at substantially 90° from the main body portion and are formed integrally with the main body portion 26 of the funk plate. The upper and lower restraining arms of the funk plate are spaced apart by a distance sufficient to allow them to be located respectively above and below the upper and lower surfaces of the slat track 4, as best seen from FIG. 3. In FIG. 3 the upper and lower supporting rollers and the slat track drive roller are not shown for the sake of clarity. However, the slat track 4 would in normal circumstances be supported by the support rollers and track drive roller in an analogous fashion as to the prior art arrangement described in relation to FIG. 1. Consequently, it is preferable for the upper and lower restraining arms 32, 34 of the funk plate of embodiments of the current invention to be spaced apart such that there is some clearance provided between the upper and lower surfaces of the slat track 4 and the restraining arms under normal operating circumstances. In the event of a failure of one or both of the upper and lower support rollers one or both of the upper and lower restraining arms of the funk plate take over the function of supporting and restraining the slat track 4. It is required that the funk plate must continue to restrain the slat track in the event of such a failure until the second scheduled maintenance inspection after the failure occurs, i.e. in the event of the failure condition of the guide rollers not being identified in the first inspection after the failure has occurred. Consequently, the upper and lower wear pads 36, 38 of suitable low friction material are formed on the lower and upper faces of the upper and lower restraining arms respectively of the funk plate to allow the slat track 4 to continue to move relatively freely through its range of motion whilst being in contact with one or both of the upper and lower restraining arms. In addition, side wear pads 40 are preferably also provided on the outward face of the main body 26 between the upper and lower restraining arms of the funk plate. In the particular embodiment illustrated in FIGS. 2 and 3 the side wear pads, which are preferably also of a low friction material, are formed as separate discrete pads located on the funk plate at positions corresponding to where the sides of the slat track 4 may bear against the funk plate. However, it will be readily appreciated that the side wear pads 40 can equally be formed continuously between the upper and lower restraining arms and their location and format will depend upon the corresponding shape of the slat track 4. Unlike the upper and lower wear pads 36, 38, the side wear pads 40 function to provide a lateral load transfer path from the sides of the slat track 4 to the track ribs 14 during normal operating conditions of the slat mechanism and therefore provide the same functionality as the front side roller 18 of the prior art configuration referred to with respect to FIG. 1.

The funk plates may be manufactured from any material having the desired strength and weight properties. Examples of suitable materials include titanium and steel. The low friction material selected for the upper, lower and side wear pads may be selected from known low friction materials and may be adhered to the funk plates by any appropriate method, for example by known bonding techniques or material deposition techniques such as sputtering, depending upon the low friction material selected.

A further additional function that may be performed by the funk plates is that of providing an end stop to prevent the slat track 4 from being retracted further than its intended position when the slat is in the stowed orientation. In the prior art as illustrated in FIG. 1, an end stop 42 is incorporated into the lower surface of the slat track 4 itself such that in the event of a failure of the track drive mechanism such that the slat track is erroneously driven beyond the ordinary stop position, the end stop 42 is brought into contact with the forward lower supporting roller 8 and thus prevents the slat track 4 from being retracted further, since the upper supporting roller 6 prevents the end stop 42 from riding over the lower supporting roller 8. However, the projection of the end stop 42 below the profile of the slat track 4 requires a larger exit aperture in the underside of the wing surface to allow the track to extend into the deployed position than would otherwise be required by the slat track profile itself. The exit aperture in the lower surface of the wing has a detrimental effect on the aerodynamic performance of the wing as a whole when the slat 2 is deployed and the larger the aperture the greater the detrimental effect on the aerodynamic properties of the wing. With the funk plate of the present invention, a corresponding end stop can be incorporated on one or both of the side surfaces of the slat track 4 and arranged such that in the event of a track drive failure then the end stops will come into contact with the forward facing surface of the funk plate 24 itself, thus limiting the further retraction of the slat track 4. Since the end stops are placed on the side surfaces of the slat track 4, the exit aperture required in the under surface of the wing is reduced, thus reducing the detrimental effect of this aperture on the aerodynamic performance of the wing structure as a whole.

Figure 4:
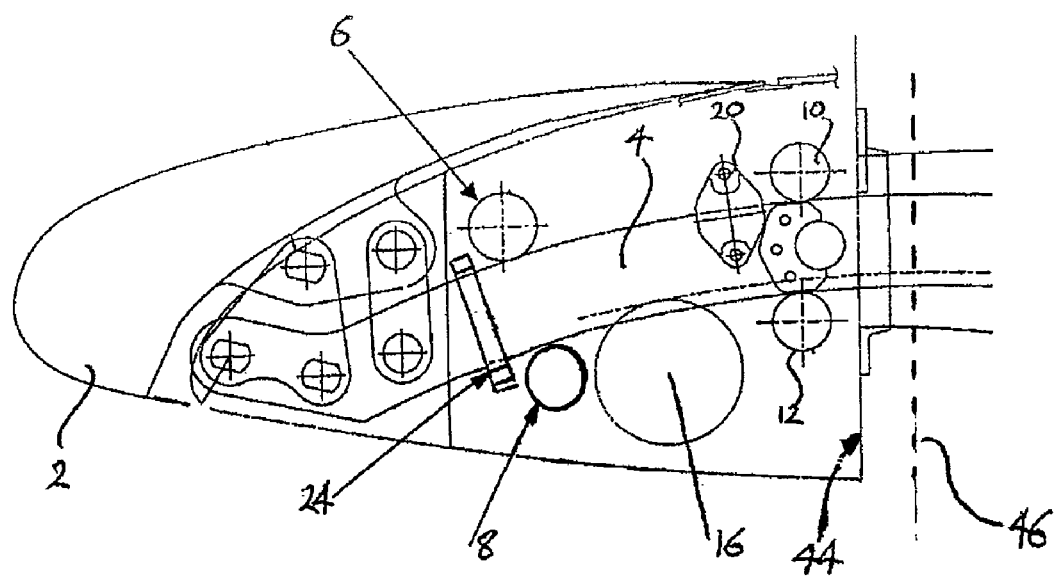
FIG. 4 schematically illustrates a slat track support and failure assembly according to an embodiment of the present invention.

A complete slat operating mechanism incorporating funk plates according to the present invention is schematically illustrated in FIG. 4 in an analogous fashion to FIG. 1. Where applicable, identical or analogous elements in FIG. 4 corresponding to elements in FIG. 1 are labelled with corresponding reference numbers. As will be noted, the inclusion of funk plates 24 according to the present invention allows the previously required funk pins 22 (FIG. 1) and side rollers 18 (FIG. 1) to be omitted from the mechanism illustrated in FIG. 4. This in turn allows the remaining elements of the mechanism and the front wing box spar 44 to be moved forward in relation to the leading edge of the wing. In FIG. 4 the position of the front wing box spar in the prior art arrangement illustrated in FIG. 1 is indicated by the broken line 46, thus indicating the distance that the front wing box spar 44 has been moved forward as a result of utilising the funk plates 24 of the present invention.

The invention claimed is:

1. An aircraft wing high lift assembly comprising a movable element and a fixed load receiving element including a body portion having a first load receiving region arranged to receive lateral loads from the movable element and to be in sliding contact with the movable element during normal operation of the high lift assembly and including at least one restraining arm projecting from the body portion, said at least one restraining arm having a second load receiving region spaced away from the movable element during normal operation and arranged to support the movable element in sliding contact in the event of a failure within the high lift assembly.

2. The assembly of claim 1, wherein the first and second load receiving regions comprise reduced friction wear pads.

3. The assembly of claim 1, wherein the load receiving element includes two restraining arms arranged such that the second load receiving region of each restraining arm face one another.

4. The assembly of claim 1, wherein a face of the movable element adjacent to the first load receiving region of the load receiving element includes a protruding stop element arranged to abut against the load receiving element and prevent further translation of the movable element in the event of a failure within the high lift assembly.

5. The assembly of claim 1, wherein the assembly comprises two load receiving elements located adjacent opposite faces of the movable element.

6. Apparatus for receiving loads from an aircraft wing high lift assembly having a movable element, the apparatus comprising a body portion having a first load receiving region arranged to receive lateral loads from the movable element of the high lift assembly and to be in sliding contact with the movable element during normal operation of the high lift assembly and at least one restraining arm projecting from the body portion having a second load receiving region spaced away from the movable element during normal operation and arranged to support the movable element of the high lift assembly in sliding contact in the event of a failure within the high lift assembly.

7. The apparatus of claim 6, wherein the first and second load receiving regions comprise low friction wear pads.

8. The apparatus of claim 6 comprising two restraining arms projecting from the body portion such that the second load receiving region of each restraining arm faces another.

9. The apparatus of claim 6, wherein the first and second load receiving regions are substantially orthogonal to one another.

* * * * *